S. G. CRANE.
ILLUMINATED WEIGHING SCALE.
APPLICATION FILED JAN. 27, 1915.
1,236,915.
Patented Aug. 14, 1917.
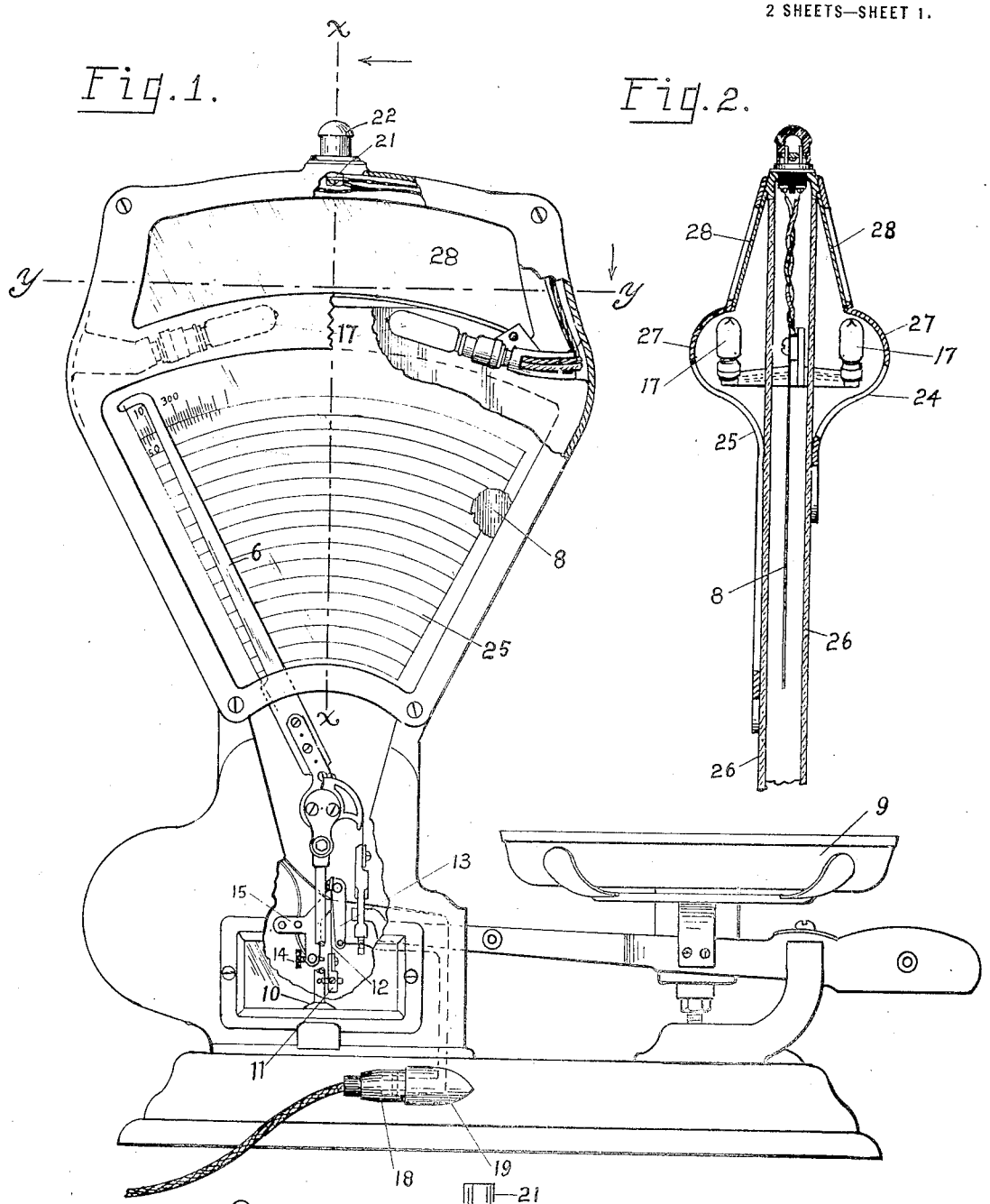
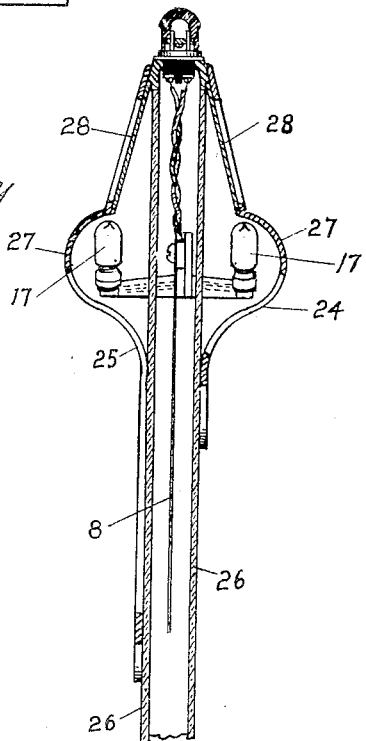
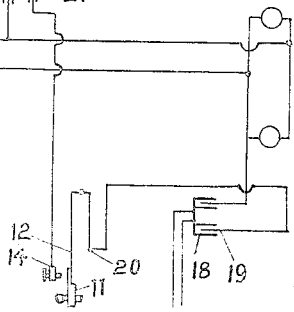
WITNESSES:
D. C. Watter
Carl J. Finkle
INVENTOR.
Samuel G. Crane
by George R. Frye
ATTORNEY S. G. CRANE.
ILLUMINATED WEIGHING SCALE.
APPLICATION FILED JAN. 27, 1915.
1,236,915.
Patented Aug. 14, 1917.
2 SHEETS—SHEET 2.
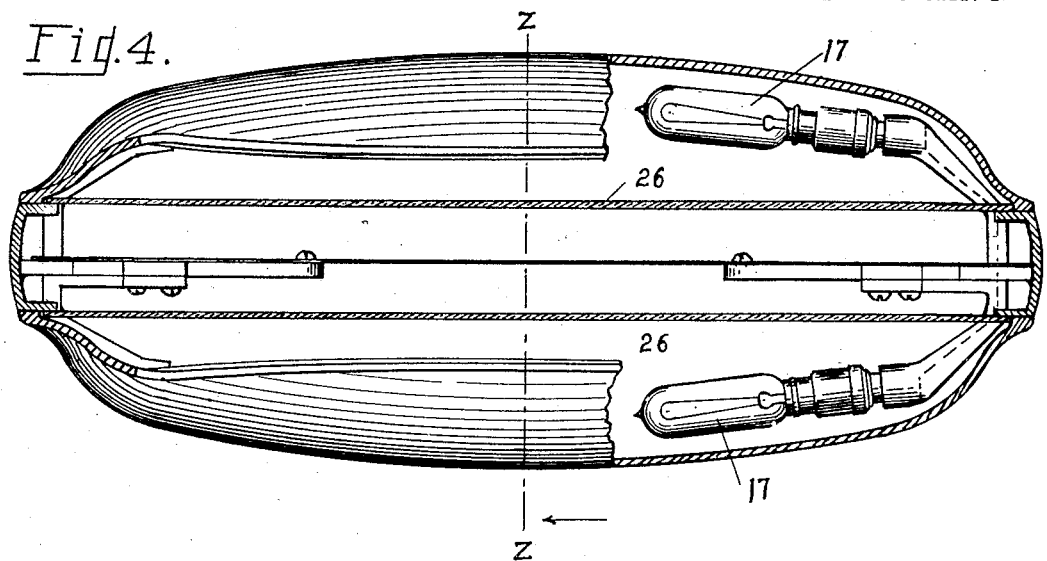
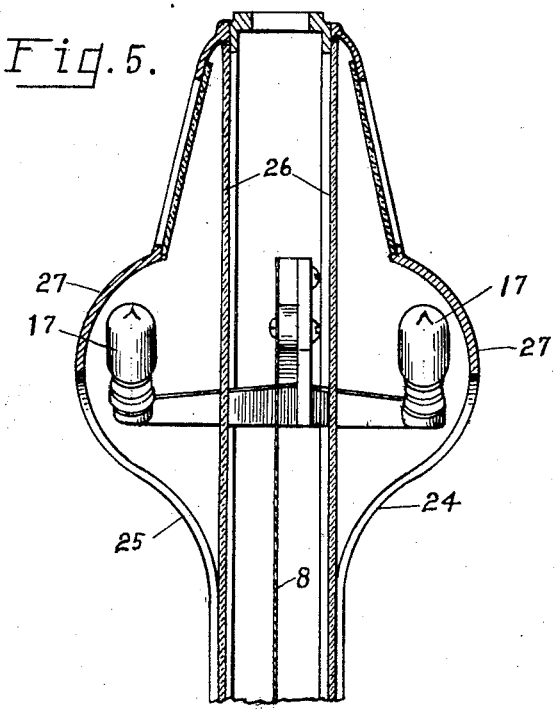
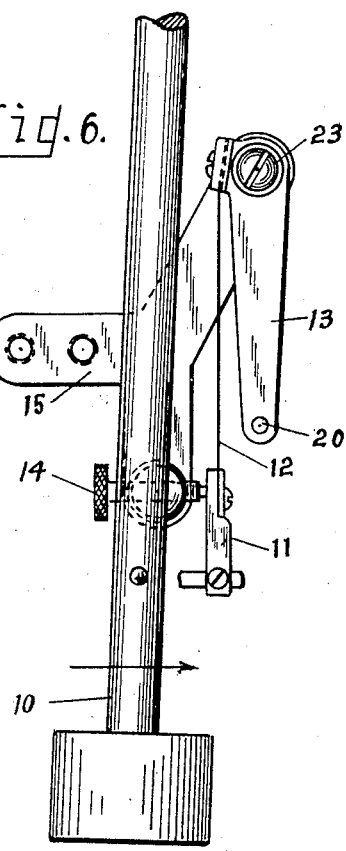
WITNESSES:
D. C. Walter
Carl J. Ginkl
INVENTOR.
Samuel G. Crane
by George R. Frye
ATTORNEY

UNITED STATES PATENT OFFICE.

SAMUEL G. CRANE, OF TOLEDO, OHIO, ASSIGNOR TO TOLEDO SCALE COMPANY, OF TOLEDO, OHIO, A CORPORATION OF NEW JERSEY.

ILLUMINATED WEIGHING-SCALE.

1,236,915.  Specification of Letters Patent.  Patented Aug. 14, 1917.

Application filed January 27, 1915. Serial No. 4,796.

*To all whom it may concern:*

Be it known that I, SAMUEL G. CRANE, a citizen of the United States, residing at Toledo, in the county of Lucas and State of Ohio, have invented certain new and useful Improvements in Illuminated Weighing-Scales, of which the following is a specification.

This invention relates to improvements in weighing and computing scale structures, and more particularly to scales of this type which are provided with self-contained artificial lighting means to illuminate the reading portions of the scale.

In the practical development of weighing and computing scales, the necessity for providing sufficient light properly distributed upon the scale chart or charts to provide clear and even illumination of the weight, value, and price computations has long existed. The difficulty of constructing a simple and efficient scale with effective lighting facilities are great and various expedients hitherto advanced have not proved entirely satisfactory in practice. In all of the scales hitherto constructed the heat of the lights employed therein has been instrumental in warping or otherwise interfering with the proper adjustment of the indicating charts and operative portions of the scale mechanism, and when attempt is made to remove the lights a sufficient distance from the readily warped parts to partially avoid the overheating thereof the opportunities and possibilities for utilizing these lights in a compact scale housing for effectively illuminating translucent advertising or display signs or charts are wasted. The ornamental character of the scale can be greatly enhanced by distributing the light through appropriately positioned translucent members, and at the same time the rays of light not directly illuminating the scale charts may be utilized.

In the present invention, it is proposed to improve the structure of weighing scales whereby a simple, compact and efficient scale is produced with lights carried thereby in position to primarily illuminate the scale charts, and simultaneously transmit a certain proportion of the light through translucent plates arranged to effectively display directive, ornamental or advertising matter.

A further object of the invention is to so construct the scale that the lights are placed in the open air, and are separated from the scale charts and other easily warped or distorted members by protective glass plates spaced from both the charts and the lights so that air can freely pass between the separated members.

In carrying the invention into practice the scale housing is constructed with light reflecting members of peculiar outline and contour, the reflecting portions of the scale housing being so shaped and positioned relatively to the lights employed that the luminous rays are directly projected upon the scale chart and the translucent plate arranged behind the scale chart—*i. e.* farther away from the source of light than the scale chart—and further so shaped and arranged that reflected rays are likewise projected upon the same scale chart and the same translucent plate.

With the above and other objects in view which will more readily appear as the invention is better understood, my invention consists in the novel construction and arrangement of parts to be hereinafter more fully described and particularly pointed out in the appended claims.

Reference is to be had to the accompanying drawings illustrating a preferred embodiment of my invention, and wherein similar reference numerals designate similar parts throughout the several views.

In the drawings:—

Figure 1 is a front elevation of a scale showing an embodiment of my invention with parts broken away.

Fig. 2 is a transverse section taken substantially on the line *x—x* of Fig. 1.

Fig. 3 is a diagrammatic view of the wiring system employed for automatically lighting the lamps employed.

Fig. 4 is a section taken substantially on the line *y—y* of Fig. 1, with parts broken away.

Fig. 5 is an enlarged transverse section through a portion of the scale taken substantially on the line *z—z* of Fig. 4, and Fig. 6 is an enlarged detailed elevation of the automatic switch mechanism employed.

In the drawings 5 designates a scale housing arranged to inclose the weighing mechanism of a computing scale, the weighing mechanism suitably actuating the index-hand 6 to swing the same through an appropriate arc to indicate on the chart 8 of the scale the weight of an article placed on the platform 9. As hereinafter shown the chart 8 is also provided with suitable price and value computations arranged to clearly indicate the value of the article weighed at the desired price per pound, in accordance with the well known manner of operation of computing scales.

It is to be understood that the weighing mechanism of the scale may be of any approved type and that the connections for suitably actuating the index-hand therefrom upon the imposition of a load upon the scale platform may be of any desired form, various mechanisms well known in the scale art being fully capable of performing the required functions. The embodiment herein illustrated is one that has been found to successfully demonstrate the capabilities of this invention, and shows a pendulum scale of a well known type with the index-hand suitably actuated in accordance with the displacement of the pendulum from its normal position, but it is to be understood that other types or forms of scales may be used.

As herein shown the pendulum 10 of the scale in its normal position—i. e. when the scale is at rest—bears against the movable switch contact member 11 suspended by the leaf spring 12 from the bracket 13 and holds the movable contact member 11 away from the fixed contact screw 14 carried by the bracket 15 secured to the scale housing so that the circuit whereby the electric lamps 17 are lighted is normally open. When, however, a load is placed upon the scale platform the pendulum 10 is swung upwardly, allowing the leaf spring 12 to carry the movable contact member 11 against the fixed contact member 14 to complete the circuit whereby the lamps 17 are lighted. The wiring system within the scale for connecting the electric lamps 17 with the batteries or other source of current is shown in diagram in Fig. 3, though it is to be understood that any suitable system may be employed. As herein shown the portable service plug 18 is suitably inserted into the fixed plug 19 carried by the base of the scale housing, and the wiring leads therefrom to the contact post 20 carried by the bracket 13, thence through the movable switch member 11 and the fixed contact member 14 to the lamps 17, which are suitably connected, as in multiple, and thence back to the fixed plug 19. Means are provided for allowing the insertion of the portable service plug 18 within the fixed plug 19 adjacent the base of the scale or within the fixed plug 21 arranged at the upper portion of the scale housing for convenience in connecting the scale with the usual wiring fixtures in stores and other dwellings. When, as shown in Fig. 1, the portable service plug 18 is inserted into the fixed plug 19 adjacent the base of the scale, a fiber jumper 22 with metallic contact members arranged to transmit the current is inserted within the plug 21 at the top of the scale housing. Suitable insulating means is provided wherever desirable, as for example, the fiber bushing 23 spaces the bracket 13 from the scale housing, and the fixed contact screw 14 is insulated from the bracket 15 carried by the scale housing.

The scale chart 8 is preferably arranged adjacent the center line of the scale housing 5, (see Fig. 4), and on its forward surface carries the weight and value numerals, as shown in Fig. 1. On its rear surface the chart 8 is preferably provided with a chart showing the weight numerals only, the weight numerals at the rear of the scale being visible through the narrow opening 24 in the scale housing (see Figs. 2 and 5), while the forward surface of the chart 8 with the weight and value numerals is visible through the elongated aperture 25 in the forward portion of the scale housing. Arranged on the opposite sides of the chart 8 and spaced an appropriate distance therefrom are protective plates 26 of transparent glass, the upper extremities of which extend substantially into contact with the top of the scale housing, as clearly shown in Figs. 2 and 5. The chart 8 is opaque and its upper extremity is spaced from the top of the scale housing, substantially as shown in Figs. 2 and 5, so that a considerable portion of the transparent glass plates 26 extends above the top of the opaque chart 8. The scale housing 5 is preferably shaped substantially as shown herein, the side portions thereof slanting outwardly from the top of the housing to a point substantially parallel the top of the chart 8, and then curving outwardly and downwardly substantially as shown at 27 in Figs. 2 and 5 to provide open chambers in which may be positioned the electric lamps 17. The inner surfaces of these outwardly bulging portions 27 are suitably coated with a reflecting substance, such as aluminum, and form reflectors for reflecting certain of the luminous rays from the electric lamps 17 onto the chart 8 and the portions of the transparent glass plates above the top of the chart. Arranged in the slanting portions of the scale housing, and substantially in alinement with the portions of the transparent glass plates 26 above the top of the chart are translucent plates 28, as, for example, of colored or ground glass, which may display directive charts, advertising matter, or ornamental designs.

In the operation of the scale, when a parcel is placed upon the platform 9 of the scale, the pendulum 10 is displaced an appropriate distance to move the index-hand 6 to indicate upon the chart 8 the weight of the parcel, the movable switch member 11 automatically completing the circuit to light the members 17, illuminating the charts upon the forward and rear surfaces of the chart 8, and simultaneously illuminating the translucent signs 28. The luminous rays from the lamps 17 at the forward portion of the housing are transmitted directly upon the forward surface of the chart 8 carrying the weight and value numerals and upon the translucent sign 28 at the rear of the scale housing through the portions of the transparent glass plates 26 above the top of the chart 8, while the luminous rays from the lamps 17 arranged in the rear portion of the scale housing are transmitted directly upon the chart showing the weight numerals only on the rear surface of the chart 8 and directly upon the translucent sign 28 arranged in the forward portion of the scale housing. Also the reflecting portions 27 of the scale housing are so shaped and positioned that certain of the luminous rays from the lamps 17 at the forward portion of the scale housing are reflected upon the chart having weight and value computations on the forward surface of the chart 8 and are reflected on the translucent sign 28 arranged in the rear portion of the scale housing, and certain reflected rays from the lamps 17 at the rear of the scale housing are reflected on the chart having the weight numerals only on the rear surface of the chart 8 and the translucent sign 28 arranged in front of the scale housing. In other words, those lamps 17 at the forward portion of the scale housing illuminate by both direct and reflected rays the chart on the forward surface of the chart 8 and the translucent sign carried by the rear portion of the scale housing, while those lamps 17 at the rear of the scale housing are employed to illuminate by both direct and reflected rays the chart upon the rear surface of the chart 8 and the translucent sign carried by the forward portion of the scale housing, the lamps 17 in each instance illuminating the sign at the opposite side of the scale housing from that on which the lamps are placed.

The curvature of the reflectors 27 of the scale housing is preferably varied in cross-section being of greater curvature adjacent the center portion thereof than adjacent the sides of the scale so that the light will be more evenly distributed over the scale charts. (See Fig. 4).

From the above it will be seen that the illustrated embodiment of my invention provides means well calculated to adequately fulfil the objects primarily stated. The construction is, however, susceptible to modification without departing from the spirit and scope of the invention as set forth in the following claims.

Having thus described my invention I claim:

1. In an illuminated scale, the combination with a scale housing, a chart having weight indications thereon, the top of said chart being spaced from the top of the scale housing, a translucent plate arranged above and behind said chart, the said plate extending substantially from the top of the chart to the top of said housing, light reflecting means carried by the housing in front of said chart, and a source of light arranged between the reflecting means and the chart in position to transmit its luminous rays upon both the chart and translucent plate.

2. In an illuminated scale, the combination with a housing, a chart having weight indications thereon, a protective glass plate arranged in front of and spaced from the chart, a translucent plate arranged above said chart, light reflecting means carried by the housing in front of the upper portion of said chart, and a source of light arranged between the reflecting means and the protective glass plate in position to transmit its luminous rays upon both the chart and translucent plate.

3. In an illuminated scale, the combination with a scale housing, a chart having weight indications thereon, the top of said chart being spaced from the top of the scale housing, a transparent protective glass plate arranged in front of and spaced from said chart and extending substantially to the top of said housing, a translucent plate arranged above said chart and back of said transparent glass plate, light reflecting means carried by the housing in front of the upper portion of said chart, and a source of light arranged between and spaced from the reflecting means and the glass plate in position to transmit its luminous rays upon both the chart and translucent plate.

4. In an illuminated weighing scale, a scale housing, an opaque chart arranged centrally of the housing and carrying indicating charts on its forward and rear surfaces, the top of said chart being spaced from the top of the housing, transparent protective glass plates on opposite sides of and spaced from said chart, translucent plates arranged in the forward and rear portions of the scale housing and above the top of the opaque chart, and a source of light arranged on each side of the scale and spaced from said transparent glass plates in position to transmit its luminous rays upon the adjacent surface of the chart and the translucent plate on the opposite side of the scale housing.

5. In an illuminated weighing scale, a scale housing, an opaque chart arranged centrally of the housing and carrying indicating charts on its forward and rear surfaces, the top of said chart being spaced from the top of the housing, transparent protective glass plates on opposite sides of and spaced from said chart, translucent plates arranged in the forward and rear portions of the scale housing and above the top of the opaque chart, light reflecting means carried by the forward and rear portions of the scale housing and below said translucent plates, and a source of light arranged between and spaced from said light reflecting means and transparent glass plates on each side of the opaque chart in position to transmit its luminous rays upon the adjacent surface of the chart and the translucent plate on the opposite side of the scale housing.

6. In an illuminated weighing scale, a scale housing, an opaque chart arranged centrally of the housing and carrying indicating charts on its forward and rear surfaces, the top of said chart being spaced from the top of the housing, transparent protective glass plates on opposite sides of and spaced from said chart, translucent plates arranged in the forward and rear portions of the scale housing and above the top of the opaque chart, light reflecting means carried by the forward and rear portions of the scale housing and below said translucent plates, and a source of light arranged between and spaced from said light reflecting means and transparent glass plates on each side of the opaque chart in position to transmit its luminous rays directly and by reflection upon the adjacent surface of the chart and the translucent plate on the opposite side of the scale housing.

7. In an illuminated weighing scale, a scale housing, an opaque chart arranged centrally of the housing and carrying indicating charts on its forward and rear surfaces, the top of said chart being spaced from the top of the housing, transparent protective glass plates on opposite sides of and spaced from said chart, translucent plates arranged in the forward and rear portions of the scale housing and above the top of the opaque chart, light reflecting means carried by the forward and rear portions of the scale housing and below said translucent plates, and a source of light arranged between and spaced from said light reflecting means and transparent glass plates on each side of the opaque chart in position to transmit its luminous rays upon the adjacent surface of the chart and the translucent plate on the opposite side of the scale housing, the light reflecting means being shaped and arranged to reflect certain of the rays upon the adjacent side of the chart and the translucent plate on the opposite side of the scale housing.

8. In an illuminated scale, a scale housing, an opaque chart having weight indications thereon, the top of said chart being spaced from the top of the scale housing, a protective transparent plate arranged in front of and spaced from said chart, a translucent plate arranged above and behind said chart, light reflecting means arranged in front of the chart and below the said translucent plate, and a source of light arranged between and spaced from the protective transparent plate and the light reflecting means in position to transmit its luminous rays directly upon said chart and said translucent plate, the light reflecting means being shaped and arranged to reflect certain of the rays upon said chart and said translucent plate.

SAMUEL G. CRANE.

Witnesses:
ELIZABETH LAZARES,
F. A. CROWLEY.